United States Patent
Matsukawa

(10) Patent No.: US 8,196,648 B2
(45) Date of Patent: Jun. 12, 2012

(54) ADJUSTABLE CONTAINER HOLDER OPERATED BY HVAC SYSTEM

(75) Inventor: Masashi Matsukawa, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 1318 days.

(21) Appl. No.: 11/644,022

(22) Filed: Dec. 21, 2006

(65) Prior Publication Data

US 2008/0149300 A1    Jun. 26, 2008

(51) Int. Cl.
B60H 1/00 (2006.01)

(52) U.S. Cl. ............ 165/202; 62/3.61; 62/3.64; 62/239; 62/244; 454/120

(58) Field of Classification Search ............ 165/41, 165/202; 62/3.64, 196.1, 216, 239, 244, 62/3.61; 454/120; 224/414; 248/311.2
See application file for complete search history.

(56) References Cited

U.S. PATENT DOCUMENTS

| | | | |
|---|---|---|---|
| 3,410,337 A * | 11/1968 | Priest | 165/41 |
| 3,505,830 A * | 4/1970 | Koerner | 62/337 |
| 3,757,851 A * | 9/1973 | Marble | 165/41 |
| 3,850,006 A * | 11/1974 | Redfern et al. | 62/216 |
| 3,858,405 A * | 1/1975 | Manzke | 62/196.1 |
| 3,916,639 A * | 11/1975 | Atkinson | 62/239 |
| 4,441,638 A * | 4/1984 | Shimano | 224/414 |
| 4,478,052 A * | 10/1984 | McDowell | 62/244 |
| 4,821,529 A * | 4/1989 | Maier | 62/239 |
| 4,852,843 A * | 8/1989 | Chandler | 248/311.2 |
| 4,892,138 A * | 1/1990 | Bibik, Jr. | 165/41 |
| 5,078,422 A * | 1/1992 | Hamilton et al. | 280/736 |
| 5,092,395 A | 3/1992 | Amidzich | |
| 5,181,555 A * | 1/1993 | Chruniak | 165/41 |
| 5,540,409 A * | 7/1996 | Cunningham | 248/311.2 |
| 5,588,480 A * | 12/1996 | Armanno, Sr. | 165/41 |
| 6,082,114 A * | 7/2000 | Leonoff | 62/3.64 |
| 6,273,810 B1 * | 8/2001 | Rhodes et al. | 454/120 |
| 7,205,016 B2 * | 4/2007 | Garwood | 426/108 |
| 2003/0170359 A1 * | 9/2003 | Garwood | 426/392 |
| 2003/0185937 A1 * | 10/2003 | Garwood | 426/35 |
| 2003/0185948 A1 * | 10/2003 | Garwood | 426/392 |
| 2007/0204629 A1 * | 9/2007 | Lofy | 62/3.61 |

* cited by examiner

Primary Examiner — Ljiljana Ciric
(74) Attorney, Agent, or Firm — Harness, Dickey & Pierce, PLC

(57) ABSTRACT

An air expandable bladder grips a beverage container within the vehicle and serves as a beverage holder. The container holder utilizes a hot air duct that receives its hot air from the heater core and its cold air from the evaporator, both of which may be located within the HVAC case. An air inlet duct receives the hot, cold, or blended air from an air mixing valve and directs the air into, and expands, the bladder. An exit orifice may exist in the bladder to release air from the bladder and provide back pressure in the bladder. A user-controlled switch permits a person to select whether hot, cold, or blended air will pass into the bladder inlet duct. The drink holder may be located within a center console, dash, door or other location within the vehicle interior.

17 Claims, 5 Drawing Sheets

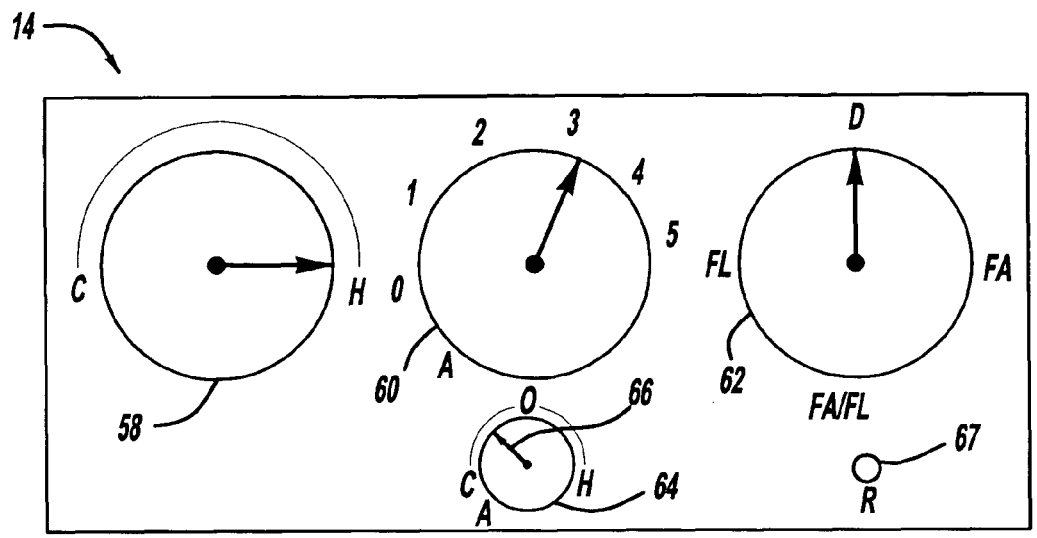
FIG - 3
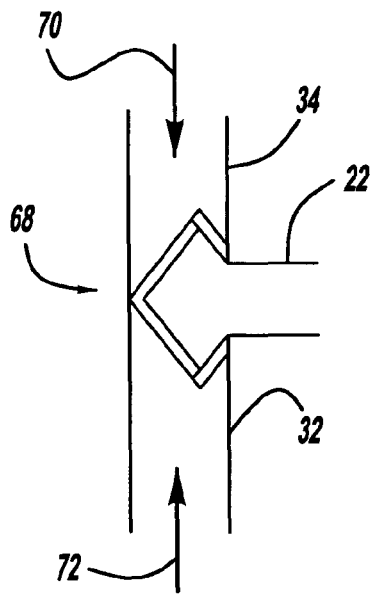
FIG - 4a
FIG - 4b
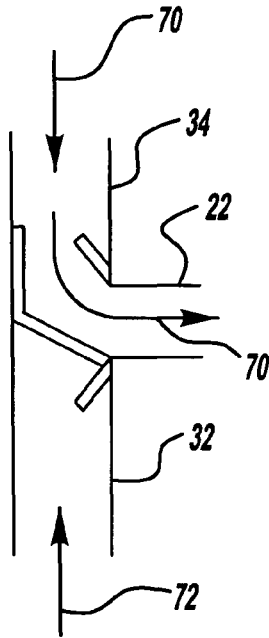
FIG - 4c

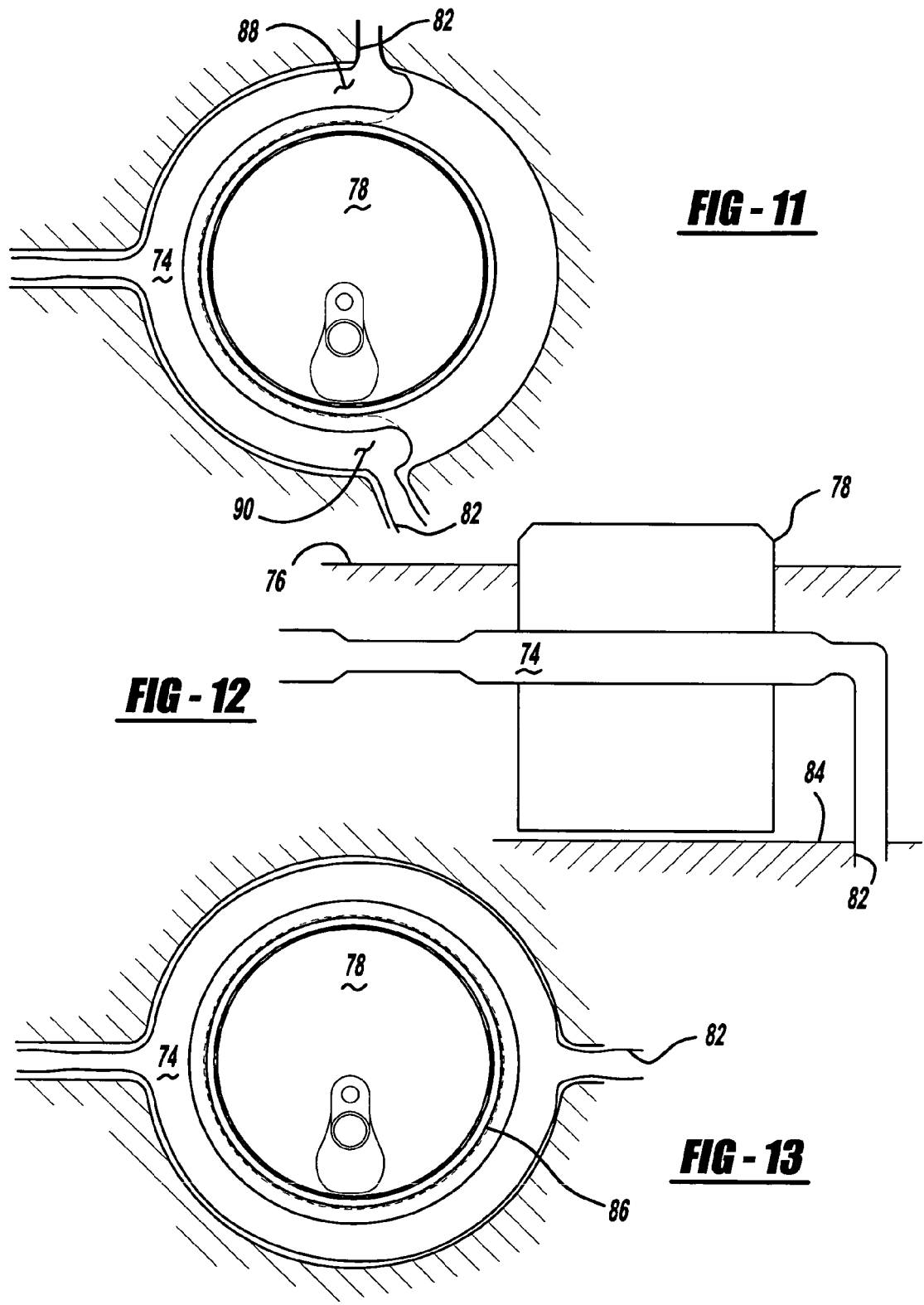

ADJUSTABLE CONTAINER HOLDER OPERATED BY HVAC SYSTEM

FIELD

The present disclosure relates to a drink holder for a vehicle, and more specifically, an adjustable drink holder operated by a vehicle HVAC system.

BACKGROUND

The statements in this section merely provide background information related to the present disclosure and may not constitute prior art. Vehicles such as passenger cars typically employ a drink or cup holder either between passenger seats, on the center column, or in the inside door panel to hold a beverage container. While current drink holders have proven satisfactory for their purposes, each is associated with its share of limitations.

One limitation of current drink holders is that many are made of a rigid, inflexible material that is essentially, a "one size fits all" type of holder; there is no adjustment for different sizes of containers. Since this does not permit containers to be securely held in place within the drink holder, the container may tip over or fall out of the drink holder as a vehicle maneuvers along a road, such as around corners. This may not only spill a drink and create a liquid, even sticky, mess, but if the drink is particularly hot, a burn to a passenger, even a pet, may result. Another limitation of current drink holders is that liquid drinks intended to be kept hot or warm, are not able to be kept at a sufficiently high enough temperature; likewise, liquid drinks intended to be kept cool or cold, are not able to be kept at a sufficiently low enough temperature. Finally, many drink holders that may attempt to securely maintain a drink container do not easily accept or release the container from such holder. Instead, a user must either firmly and somewhat harshly push the drink container into the drink holder, and then tightly grip and pull the drink container from the holder. Either process may dent or damage the drink container.

What is needed then is a device that does not suffer from the above limitations. This, in turn, will provide a device that securely holds a drink container in a cup holder while permitting the liquid contents of the container to be maintained at either, a user-selectable hot or cold temperature that is independent of the vehicle cabin temperature. Finally, the device will easily accept and release the container from the drink holder.

SUMMARY

An air expandable bladder grips a beverage container within the vehicle and serves as a beverage or container holder for a passenger. The container holder utilizes a hot air duct that receives its hot air from the heater core and its cold air from the evaporator, both of which may be located within the HVAC case. An air inlet duct receives the hot, cold, or blended air from an air mixing valve and directs the air into, and expands, the bladder. An exit orifice may exist in the bladder to release air from the bladder and provide back pressure in the bladder. A user-controlled switch permits a person to select whether hot, cold, or blended air will pass into the bladder inlet duct. The drink holder may be located within a center console, dash, door or other location within the vehicle interior. For the expandable bladder to grip a container, the bladder may be made out of an expandable material, such as rubber or synthetic rubber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a front view of a control panel depicting various control options of an HVAC system and an inflatable bladder of a drink holder;

FIG. 4a is a side view of drink holder air supply ducts and an associated valve in the closed position;

FIG. 4b is a side view of drink holder air supply ducts and an associated valve in the cold air flow position;

FIG. 4c is a side view of drink holder air supply ducts and an associated valve in the hot air flow position;

FIG. 11 is a top view of a third embodiment of an inflatable drink holder depicting partial coverage of a drink container by the drink holder;

FIG. 12 is a side view of a fourth embodiment of an inflatable drink holder depicting circular coverage of a drink container by the drink holder; and FIG. 13 is a top view of a fourth embodiment of an inflatable drink holder depicting circular coverage of a drink container by the drink holder.

DETAILED DESCRIPTION

Figure 1:
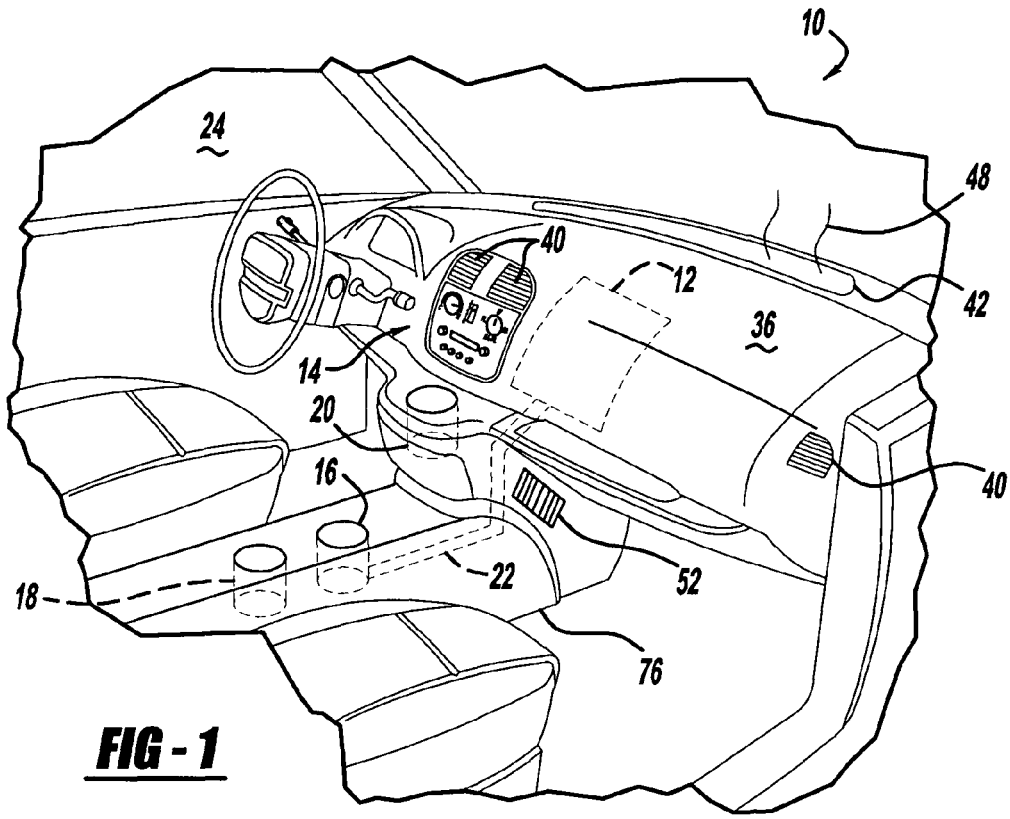
FIG. 1 is a perspective view of a vehicle interior depicting the location of an HVAC case and drink holders.

The following description is merely exemplary in nature and is not intended to limit the present disclosure, application, or uses. It should be understood that throughout the drawings, corresponding reference numerals indicate like or corresponding parts and features. Turning now to the embodiments of FIGS. 1-13, and beginning specifically with the embodiment of FIG. 1, details of the present invention will be explained. FIG. 1 depicts a vehicle 10, within which an HVAC case 12, HVAC controls 14, and container holders 16, 18, 20 reside. Throughout the detailed description, the term "container holder" will be used to describe the receptacle or location within which a liquid drink container, as an example, may be placed. Other terms, such as a drink holder, beverage holder, or similar term may be used interchangeably. Additionally, the material, such as a liquid, inside a representative container is not limited to a drink, but may be yogurt, soup, etc., which may not normally be thought of as drinks per se; however, they are nonetheless liquids or semi-liquid and therefore may be utilized within the teachings of the present invention. For purposes of explanation, the container holder 16 will be used in describing the teachings of the present invention, although container holders 18, 20 may easily substitute.

Figure 2:
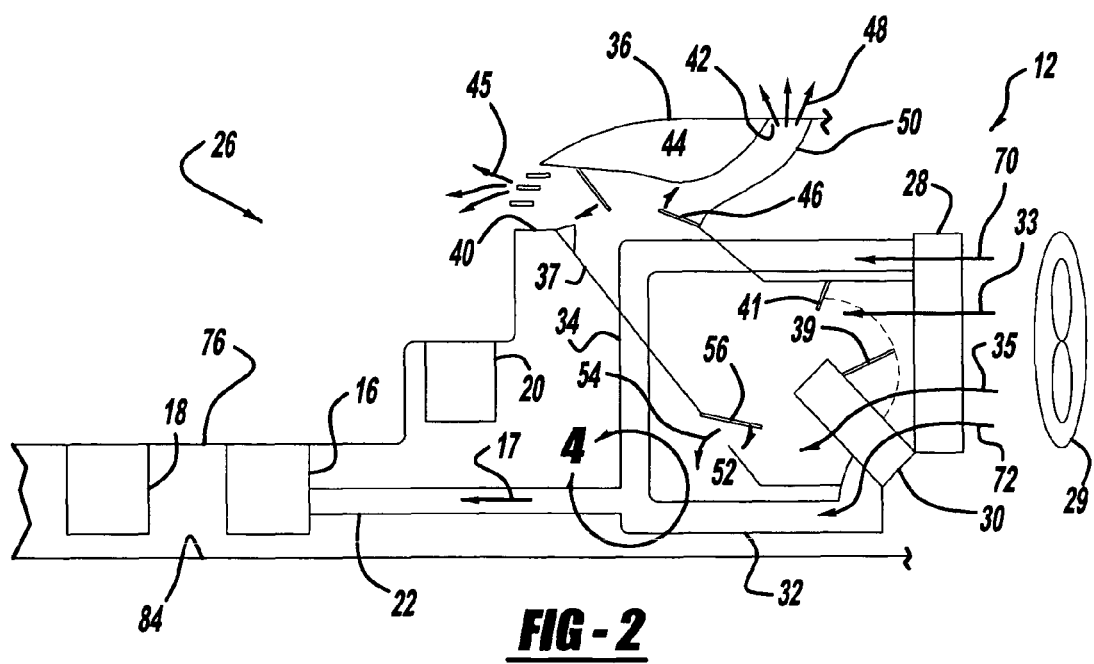
FIG. 2 is a side view of an HVAC case, conduit and drink holders in a center console and dash location.

Continuing with FIGS. 1 and 2, the container holder 16 is directed into the HVAC case 12 by an air inlet duct 22. To be discussed in more detail later, the air inlet duct 22 directs air 17 into the container holder 16. The HVAC controls 14 are generally used by the front passengers to control the temperature of the air discharged into the interior cabin 24. Regarding operation of the HVAC system 26, the HVAC case 12 generally contains an evaporator 28, a heater core 30, a hot air duct 32, a cold air duct 34, and a main duct 37. The main duct 37 protrudes from the HVAC case 12 and into the dash 36 that defines face outlets 40 and a defroster outlet 42. A face door 44 controls face air 45 directed through a face duct to the face outlets 40, while a defroster door 46 controls defroster air 48 directed through a defroster duct 50 that discharges through the defroster outlet 42. The HVAC case 12 may also have a foot outlet 52 that discharges foot air 54 in accordance with the position of a foot door 56.

Now, with continued reference to FIGS. 1-2 and 3, further operation of the HVAC case 12 will be explained. The HVAC case 12 and its associated HVAC controls 14 operate in much the same manner as other traditional vehicle HVAC cases and HVAC systems. The HVAC controls 14 have a temperature dial 58, fan speed dial 60, and air outlet dial 62. The temperature dial 58 permits the user to select the temperature at which air will be discharged from the various outlets, such as the face outlets 40, defroster outlet 42, and foot outlets 52. The fan speed dial 60 permits the user to select the speed and volume of the air 45, 48, and 54 passing through the above-mentioned ducts. The air outlet dial 62 permits the user to select the ducts from which air will pass into the vehicle cabin 24; "D" represents "defroster," "FA" represents "face," "FL" represents "floor" and "FA/FL" represents "face and floor."

In order to pass air into the HVAC case 12 and subsequently into the vehicle cabin 24, a fan 29 is used in association with the fan speed control dial 60. The fan 29 generates air flow generally depicted by arrows 70, 33, 35, and 72. Air flow 70 passes through the evaporator 28 and into the cold air duct 34, which fluidly communicates or receives air from the evaporator 28, while air flow 33 passes through the evaporator 28 and into the HVAC case 12. Air flow 35 passes through the evaporator 28 and then through the heater core 30, while air flow 72 passes through the evaporator 28 and the heater core 30 before passing into the hot air duct 32, which fluidly communicates with or receives air from the heater core 30. Air flows 33 and 35 are the air flows largely responsible for heating and cooling the vehicle cabin 24, while air flows 70 and 72 are responsible for cooling or heating a bladder of the container holder 16, which will be explained later. To cool the interior cabin with conditioned air, an air conditioning compressor (not shown) is invoked and a heater core door 39 is manipulated between a closed position against the heater core 30 to restrict hot air from entering the vehicle cabin 24. The heater core door 39 is positioned against a stop 41, in an open position, when warm air is desired in the vehicle cabin 24. While the HVAC controls 14 depicted in FIG. 3 are similar to traditional controls, there is the addition of a container holder dial 64.

The container holder dial 64 depicted in FIG. 3 has a "C" or cold range, an "H" or hot range, and an "O" or off position to which a knob or pointer 66 may be turned by a user. When the pointer 66 of the container holder dial 64 is turned, a valve 68 (FIG. 4a-4c) at the entrance of the air inlet duct 22 changes position. For instance, when the container holder dial 64 is in the "O" position, the valve 68 is in the "off" position depicted in FIG. 4a. When in the off position, neither cold air 70 nor hot air 72 is able to enter the air inlet duct 22, which receives cold air from cold air duct 34 and hot air from hot air duct 32. When air is not able to enter the air inlet duct 22, the inflatable bladder 74 (FIG. 5) within the container holder 16, will not inflate, and remain deflated and pliable. To the contrary, as FIG. 4b depicts, when the container holder dial 64 is turned to the "H" position, only hot air 72 flows into the air inlet duct 22. Similarly, as depicted in FIG. 4c, when the container holder dial 64 is turned to the "C" position, only cold air 70 flows into the air inlet duct 22. When air flows into the air inlet duct 22, the inflatable bladder 74 inflates and because the valve 68 is capable of intermediate positions, a mix of hot and cold air in a full range of temperatures between "C" and "H" is possible.

With the HVAC controls 14 configured in the above-described manner, the advantage of setting the temperature of the vehicle cabin 24 separately from the temperature of the air forced into the bladder 74 of the container holder 16 becomes evident. That is, on a hot summer day when a vehicle occupant operates the air conditioning, he or she may still deliver heat to the container holder 16 to maintain heat in a hot cup of coffee, for example. Likewise, on a cold winter day when the heater is forcing hot air into the vehicle cabin 24, a driver may choose to deliver cold air to the container holder 16 to keep a soft drink cold.

Figure 5:
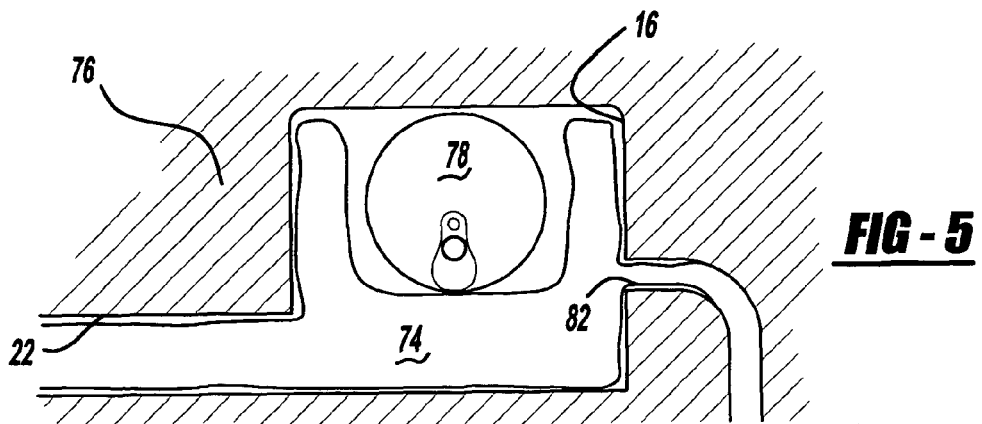
FIG. 5 is a top view of a first embodiment of an inflatable drink holder in a non-inflated state according to the invention.
Figure 6:
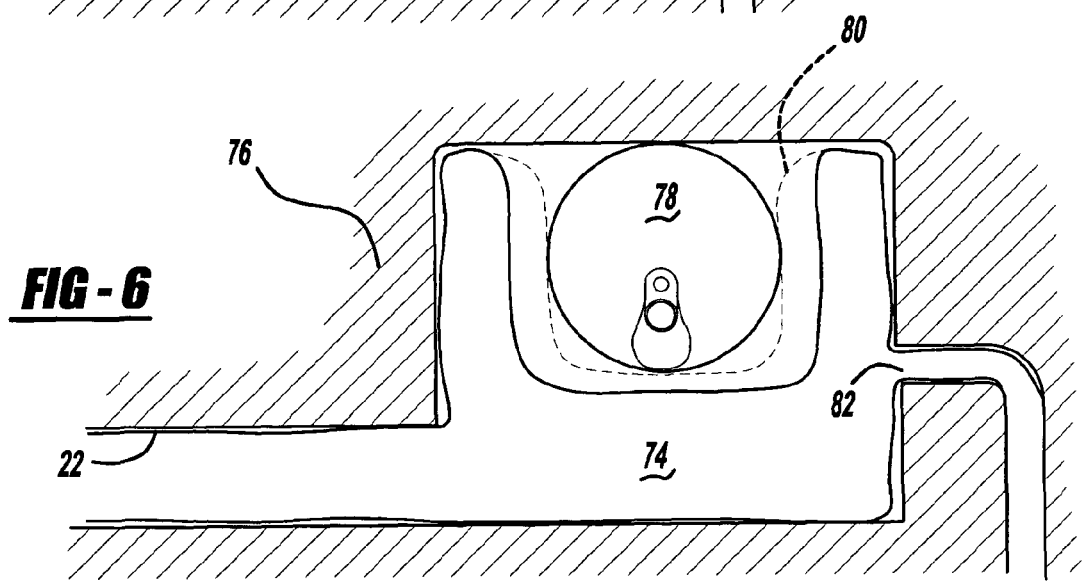
FIG. 6 is a top view of a first embodiment of an inflatable drink holder depicting an inflated boundary according to the invention.

The configuration and inflation of the inflatable bladder 74 will now be explained with reference to FIGS. 5-6. FIG. 5 is a top view of a first embodiment of an inflatable bladder 74 in a non-inflated state while FIG. 6 is the same top view depicting the bladder 74 in an inflated state with an inflated boundary denoted by a dashed line 80. FIGS. 5 and 6 are top views, as if one were looking down on the center console 76 from above. More specifically, the bladder 74 lies within the container holder 16 such that a container 78, such as a bottle, can, carton, etc. can be easily deposited into the container holder 16 when the bladder 74 is in its non-inflated state. To be in such a non-inflated state, the container holder dial 64 may be in the "0" position or the HVAC fan speed dial 60 may be in the "0" or off position, both of which stop any significant flow of air into the bladder 74. As depicted, when the bladder 74 is in the non-inflated state, there is a gap between the container 78 and the bladder 74 that permits the container 78 to be easily inserted and removed within the confines of the bladder 74 within the container holder 16. However, when cold air 70 or hot air 72 is permitted to enter the bladder 74, the bladder expands to a bladder inflated state against the container 78, as depicted by the dashed line 80. In this situation, the bladder securely grips the container 78 and prevents it from moving within the container holder 16 while heating or cooling the container 78 and its contents. Although the container 78 depicted in FIGS. 5 and 6 is circular in shape, an actual container may also be square or rectangular in shape and be securely held in place by the inflatable bladder 74, which may also, be square or rectangular in shape. Multiple shapes of the bladder 74 are conceivable. The inflatable bladder 74 may be made in a variety of general shapes to accommodate many different container shapes.

Continuing with reference to FIGS. 5 and 6, an exit orifice 82 may exist in the bladder 74 to permit air to exit the bladder 74 and create back pressure in the bladder 74 so that the bladder 74 retains its inflated shape as air is flowing into the bladder 74. The exit orifice 82 may have a cross-section that is smaller than the air inlet duct 22 to maintain backpressure in the bladder 74 and the smaller the cross-section of the exit orifice 82, the greater the back pressure in the bladder 74. While FIGS. 5 and 6 depict the exit orifice 82 in the side of the center console 76, the exit orifice may be directed downwardly to bleed the exit air under the console. An advantage of bleeding under the console 76 is that any noise from the exiting air can be kept to a minimum in the vehicle cabin.

Figure 7:
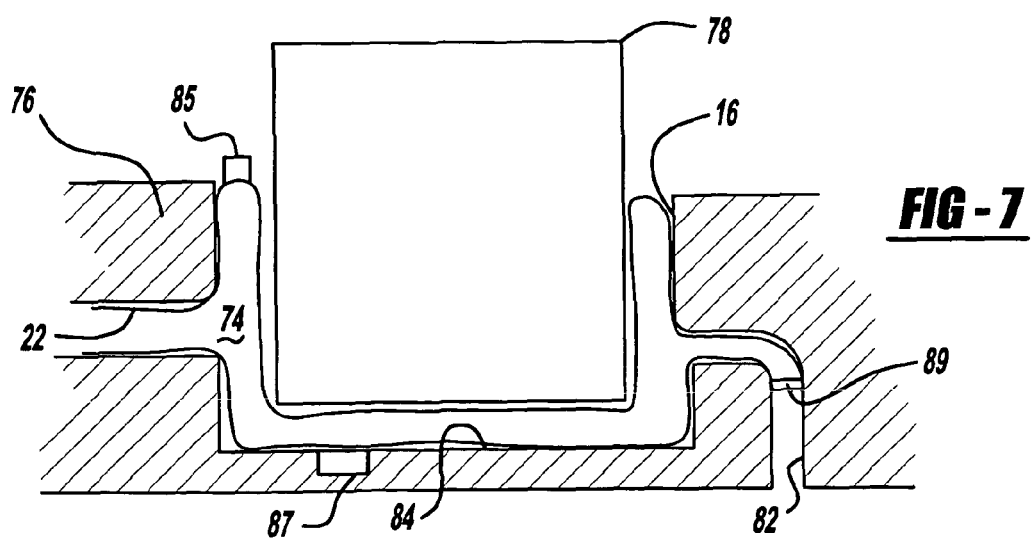
FIG. 7 is a side view of a second embodiment of an inflatable drink holder in a non-inflated state according to the invention.
Figure 8:
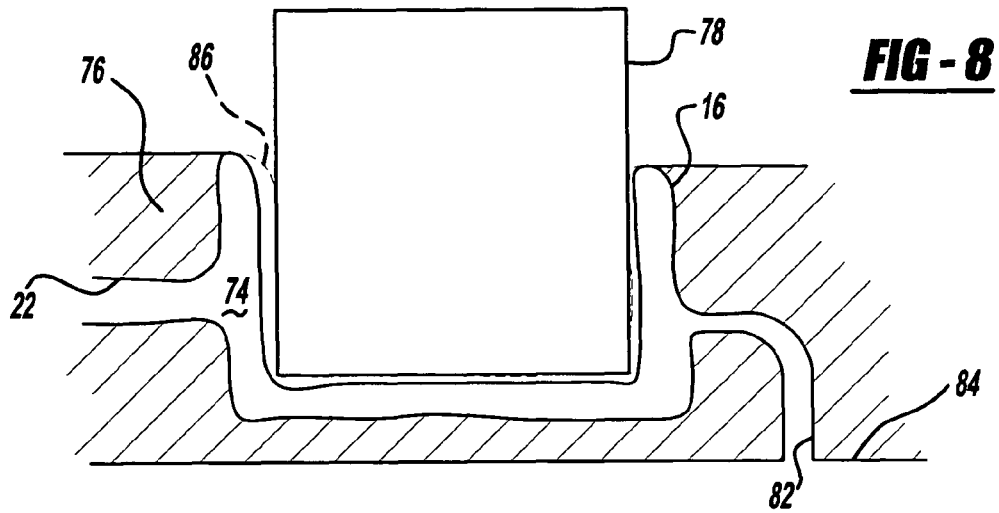
FIG. 8 is a side view of a second embodiment of an inflatable drink holder depicting an inflated boundary according to the invention.

FIG. 7 depicts a side view of a second embodiment of a bladder 74 within a container holder 16 of the center console 76 with the bladder 74 depicted in a non-inflated state while FIG. 8 depicts the non-inflated and inflated boundaries of the bladder 74. The embodiment of FIGS. 7 and 8 depicts the bladder 74 on a bottom surface 84 of the console 76 under the container 78, which is different from the embodiment depicted in FIGS. 5 and 6 in which the bladder 74 grips the side(s) of the container 78, and does not pass under the container. By configuring the bladder 74 to also contact the bottom of the container 78, heat from the bladder 74 will not only transfer into the container 78 by conduction, but heat will also transfer into the bladder 74 more efficiently by the phenomena of heat rising. When cold air is moved though the bladder 74, heat is transferred out of the bladder through the bottom of the container 78. Because the bladder 74 also wraps around the side of the container 78 in FIGS. 7 and 8, more heat is transferred into or out of the container 78, depending upon the temperature of the air moving through the bladder 74. FIG. 7 depicts the bladder in a non-inflated state, in which the bladder releases its tight grip on the container, which permits the container to be easily placed into and out of the container holder 16 and bladder 74, while in FIG. 8, the bladder is in its inflated state 86 as depicted by the dashed line 86.

As in the first embodiment, the second embodiment of FIGS. 7 and 8 depict an exit orifice 82 that permits hot or cold air to be continuously forced through the bladder 74 from the air inlet duct 22. An advantage of the exit orifice 82 is that the temperature of the air in the bladder 74 is maintained as closely as possible to the temperature of the air moving through the air inlet duct 22. As a result, the temperature of the liquid in the container 78 is maintained as closely as possible to the desired temperature, be it a cold liquid or a hot liquid.

Figure 9:
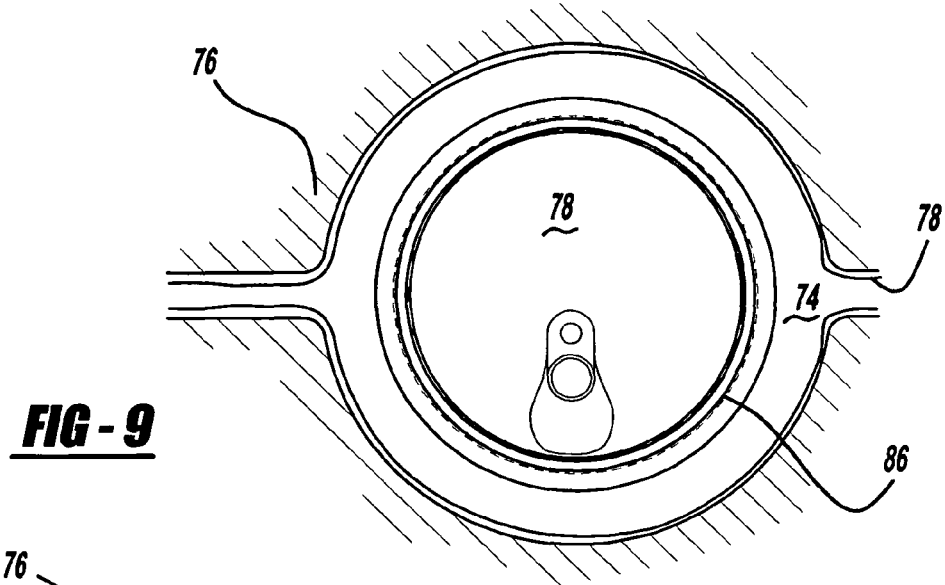
FIG. 9 is a top view of a second embodiment of an inflatable drink holder depicting inflated and non-inflated boundaries.

FIG. 9 is a top view of the second embodiment of FIGS. 7 and 8 and depicts the inflated and non-inflated relationship of the bladder 74 to the container 78. More specifically, the non-inflated state of the bladder 74 is depicted with a solid line, while the inflated state of the bladder is depicted with a dashed line 86. When inflated, the bladder 74 securely contacts and grips the container 78 over a wide surface area.

Figure 10:
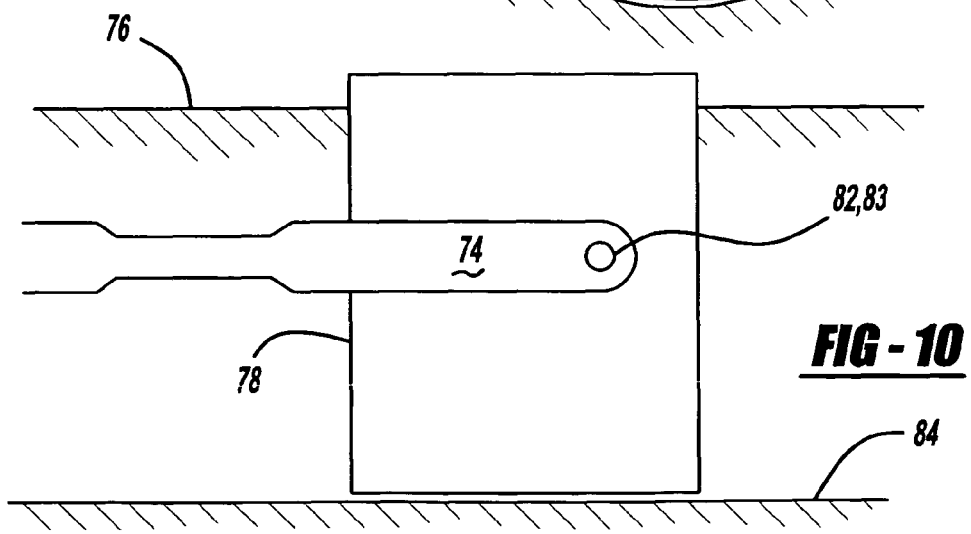
FIG. 10 is a side view of a third embodiment of an inflatable drink holder depicting partial coverage of a drink container by the drink holder.

Turning now to a third embodiment of FIG. 10, which is a side view of the bladder 74 around the container 78, and FIG. 11, which is a corresponding top view, another configuration of the bladder 74 is depicted. More specifically, FIG. 10 depicts the bladder 74 in a semi-circular form with an exit orifice 82 positioned at an end of each of the first passage 88 and second passage 90 around the container 78. With the exit orifices 82 configured in such a way, the air flowing through the bladder 74 is kept moving and is continuously replaced. Such replacement of air maintains the bladder 74 with the desired temperature of air.

A fourth embodiment of the invention is depicted by FIG. 12, which is a side view of the bladder 74 around the container 78 within the center console 76, and FIG. 13, which is a top view of the bladder 74 around the container 78. FIG. 12 depicts the bladder 74 in a non-inflated state while FIG. 13 depicts boundaries of the bladder 74 in an inflated and non-inflated state. More specifically, the non-inflated state of the bladder 74 is depicted with a solid line, while the inflated state of the bladder is depicted with a dashed line 86. When inflated, the bladder 74 securely contacts and grips the container 78. As in other embodiments, an exit orifice 82 permits the air flowing through the bladder 74 to be kept moving and is continuously replaced. Such replacement of air maintains the bladder 74 with the desired temperature of air. The exit orifice 82 exits the center console 76 through a bottom surface 84 of the console. With the exit orifice 82 in a bottom location, noise associated with exiting air may be reduced.

The bladder 74, because of its expandability and ability to inflate upon filling with air, may be made from a variety of elastic materials. Such elastic materials may be natural rubber, synthetic rubber, or another man-made material.

While various embodiments of the invention have been presented above, variations of such embodiments are within the scope of the invention. For instance, while the hot or cold are has generally been described as being generated by a heater core 30 or an evaporator 28, respectively, such hot or cold air may be sourced from outside of the vehicle cabin 24. In such an instance, the fan 29 would draw in outside air and direct it through the heater core 30 or evaporator 28 and into the air inlet duct 22 without the air 17 being warmed or cooled by such HVAC components. To the contrary, the hot outside air could be used to heat a hot drink or cool a cold drink. In fact, cold outside air, such as is abundant during winter, could be used to cool cold drinks, thereby reducing the load on a vehicle's A/C compressor. Therefore, stated differently, the inflatable beverage holders may be used even when the HVAC case, that is the heater core 30 and evaporator 28 is not being used, per se.

In presenting embodiments of the present invention, the HVAC case 12 is depicted as residing within or behind the dash 36 to supply air to the cup holder 16, and alternatively cup holders 18, 20; however, alternatives are possible. For instance, a separate rear HVAC case (not depicted) may reside in the rear of a vehicle, such as in a limousine. In such an example, the rear HVAC case may serve separate, additional, inflatable beverage container holders, similar to those depicted in the Figures of the present invention. Such rear passenger inflatable beverage containers provide an added convenience for rear passengers.

Additionally, while not specifically discussed in terms of structure, every inflatable beverage container, whether in a front or rear location, may be operated individually. Such individual operation may require additional air inlet tubes 22 the passage of air through which is governed by additional valves 68. Such individually controlled inflatable beverage holders provide added convenience when there are multiple vehicle passengers.

Another modification of the above-described invention that is conceivable is that the HVAC controls 14 may have an automatic or "A" setting on the fan speed dial 60 and an "A" setting on the container holder dial 64. When both of such "A" settings are selected, the air 17 passing into the inflatable bladder of a beverage container 16 is the same as the air 45 that is passing into the vehicle cabin 24. At such "A" settings, when the air temperature of the cabin air reaches the desired temperature, the fan 29 may actually turn off and then on again as necessary. Finally, such automatic control switches may be located anywhere in the vehicle, and not only the HVAC control panel.

While continuous air circulation through the inflatable bladder 74 is depicted in the embodiments of FIGS. 5-13, a valve at the location of orifice 82 is another example of how to provide proper inflation to the inflatable bladder 74 while at the same time, exchanging air in the bladder 74. For instance, FIG. 10 depicts an exit orifice 82 in the bladder. It is also conceivable that a bladder valve 83, may serve as the structure for limiting or permitting air passage out of the inflatable bladder 74. In operation, a bladder valve 83 may be configured on the bladder 74 to release air within the bladder 74 when the pressure within the bladder reaches a predetermined pressure. Alternatively, a button 67 may be placed in the vehicle, such as on the HVAC control panel 14 such that when the button is pressed, the bladder valve 83 releases air from the bladder 74. When air is released from inside the bladder 74, the grip on a beverage container within the bladder will be released such that the container may be withdrawn from the container holder 16, for instance. Alternatively, the button 67 denoted by "R" for release, may be pressed to release air in the bladder 74 so that "new" hot air, cold air, etc. can circulate into the bladder 74. Such a bladder valve 83 may be in the bladder 74 or in the conduit leading away from the bladder, such at exit orifice 82. A bladder valve 83 is useful since the multiple fan speeds on the selectable fan speed dial 60 may cause the pressure within the bladder 74 to increase as the fan speed is increased.

Although an inflatable bladder 74 of the container holder 16 has been described as being inflatable and deflatable when dash controls such as the HVAC controls 14 are manipulated, other means of inflating and deflating the bladder are conceivable. For instance, a manual release valve or sensor 85 (FIG. 7) located directly on the bladder 74 may be used to deflate the bladder 74, to remove a container 78 from the bladder 74 or simply to move new, warmer or cooler air through the bladder 74. Moving new air through the bladder can re-heat or re-cool the bladder. Another feature of the container holder 16 of FIG. 7 is a weight sensor 87 that can be used to sense whether a beverage container 78 is in the container holder 16. Functionally, when a container 78 with liquid, etc. has significant enough weight, a weight sensor 87 senses the weight of the container and liquid and inflates the bladder 74 automatically. To deflate the bladder 74 to remove the container 78, simply lifting on the container 78 may affect the weight on the sensor to permit the bladder 74 to deflate so as to facilitate continued removal of the container 78. The weight sensor 87 may work in conjunction with a bladder valve 89 in the exit orifice 82 to release air dependant upon the weight in the container 78. Control between the weight sensor 87 and the bladder valve 89 may be through a controller (not shown), such as an HVAC controller (not shown) and associated wiring.

Based upon the above description of the teachings of the present invention, multiple advantages of the invention become evident. A first advantage is that the inflatable bladder 74 of the container holder 16 is able to maintain liquids at a hot or cold temperature, independent of the vehicle interior cabin temperature. Additionally, the source of the heat to keep drinks hot is the hot water circulating in the engine, which passes though the heater core 30. By sourcing the heat in this fashion, no electrical heating coils are necessary and therefore, energy from a battery and thus, an alternator, is not necessary. The source of the cool air for the inflatable bladder 74 is the evaporator 28, which obtains its cool liquid from an air conditioning compressor. Because the compressor may already be operating during particular seasons of the year, sourcing cool air from the evaporator is efficient compared to operating a separate compressor with electricity. Another advantage of the invention is that drink containers are securely held in place by the inflatable bladder 74, which adapts to the shape, be it circular, square, etc. and the girth of the applicable drink container. Finally, when air flowing into the bladder 74 is stopped, a drink container 78 may be pulled from the bladder 74 and container holder 16. Finally, although a container receptacle 16 in a center console 76 was used to illustrate the teachings of the invention, receptacles in other areas are possible, such as in the dash 36, as depicted with container holder 20. Additionally, a bladder 74 in each container holder location could be utilized.

What is claimed is:

1. A liquid drink container receptacle in a vehicle comprising:
    an HVAC case that contains an evaporator and a heater core;
    an inner wall and a bottom surface of the liquid drink container receptacle which together surround the liquid drink container;
    an air inlet duct connected to an opening on the inner wall; and
    a bladder set along the inner wall and the bottom surface, the bladder for receiving air from either of the evaporator or the heater core via the air inlet duct, the bladder inflating between the inner wall and the liquid drink container and between the bottom surface and the CUP and contacting the liquid drink container.

2. The liquid drink container receptacle of claim 1, further comprising:
    an air outlet orifice in the bladder that permits air to exit from the bladder.

3. The liquid drink container receptacle of claim 1, further comprising:
    a valve to control air flowing into the air inlet duct and the bladder.

4. The cup holder of claim 1, further comprising:
    a valve to control air flowing into the air inlet duct and the bladder; and
    a switch to control positions of the valve.

5. The cup holder of claim 1, the apparatus further comprising:
    a valve to control air exiting the bladder.

6. The liquid drink container receptacle of claim 1, further comprising a manual release valve on the bladder.

7. The liquid drink container receptacle of claim 1, further comprising:
    a weight sensor within the liquid drink container receptacle that senses weight of the liquid drink container.

8. The liquid drink container receptacle of claim 7, further comprising:
    a bladder valve located in the bladder to release air in the bladder in accordance with weight sensed by the weight sensor.

9. The liquid drink container receptacle of claim 1, further comprising:
    a bladder valve to release air from the bladder; and
    a release button, wherein the release button activates the bladder valve.

10. The liquid drink container receptacle of claim 1, wherein the bladder is made of rubber.

11. The liquid drink container receptacle of claim 1, wherein the bladder forms a cylindrical shape.

12. A liquid drink container receptacle in a vehicle comprising:
    an inner wall and a bottom surface of the liquid drink container receptacle which accepts the liquid drink container;
    a hot air duct that fluidly communicates with a heater core;
    a cold air duct that fluidly communicates with an evaporator;

an air inlet duct connected to an opening on the inner wall;
a first valve to direct air from the hot air duct and the cold air duct to the inlet duct; and
a bladder set along the inner wall and over and against the bottom surface, the bladder for receiving air from the air inlet duct and inflating between the inner wall and the liquid drink container and between the bottom surface and the liquid drink container and contacting the liquid drink container on a bottom surface of the liquid drink container.

13. The liquid drink container receptacle claim 12, further comprising a second valve in the bladder, wherein the second valve expels air from the bladder.

14. The liquid drink container receptacle of claim 12, further comprising a switch, wherein the switch controls a position of the first valve.

15. The liquid drink container receptacle of claim 12, wherein the bladder defines an orifice that expels air.

16. The liquid drink container receptacle of claim 12, further comprising:
a bladder valve; and
a weight sensor, wherein the weight sensor triggers the bladder valve to expel air when there is weight on the weight sensor.

17. A liquid drink container receptacle in a vehicle comprising:
an inner wall and a bottom surface of the liquid drink container receptacle, the inner wall defining an opening, the inner wall and the bottom surface surrounding a portion of the liquid drink container;
an air inlet duct connected to the opening defined by the inner wall;
a valve to control air blending between a hot air duct and a cold air duct and to direct blended air into the air inlet duct;
an expanded bladder set along the inner wall and over and against the bottom surface, the expanded bladder configured to receive air from the air inlet duct and be inflated between the inner wall and the liquid drink container and contacting the inner wall and the liquid drink container, the expanded bladder inflated between the bottom surface and the liquid drink container and contacting the bottom surface of the liquid drink container;
a weight sensor located under the bladder and in the bottom surface of the liquid drink container receptacle; and
a bladder exit valve that opens and closes to respectively deflate and inflate the bladder according to a weight sensed by the weight sensor.

\* \* \* \* \*